(12) United States Patent
Schwager et al.

(10) Patent No.: US 11,633,823 B2
(45) Date of Patent: Apr. 25, 2023

(54) LANCE AND MINIMUM QUANTITY LUBRICATION TOOL HAVING A LANCE

(71) Applicant: Ford Global Technologies, LLC, Dearborn, MI (US)

(72) Inventors: Bryce Andrew Schwager, Ypsilanti, MI (US); David Alan Stephenson, Detroit, MI (US); Richard Earl Williford, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 17/198,761

(22) Filed: Mar. 11, 2021

(65) Prior Publication Data
US 2022/0288737 A1    Sep. 15, 2022

(51) Int. Cl.
*B23Q 11/10* (2006.01)
*F16N 7/32* (2006.01)
*B23B 51/06* (2006.01)

(52) U.S. Cl.
CPC ...... *B23Q 11/1046* (2013.01); *B23Q 11/1023* (2013.01); *B23B 51/06* (2013.01); *F16N 7/32* (2013.01)

(58) Field of Classification Search
CPC .. B23Q 11/1046; B23Q 11/1023; B23B 51/06
See application file for complete search history.

(56) References Cited

U.S. PATENT DOCUMENTS

| 6,669,104 | B2 | 12/2003 | Koveal et al. | |
| 2007/0014647 | A1* | 1/2007 | Watzke | B23G 5/005 |
| | | | | 409/136 |
| 2012/0325321 | A1* | 12/2012 | Perry | B23Q 11/1023 |
| | | | | 137/1 |

FOREIGN PATENT DOCUMENTS

| CN | 208696980 | | 4/2019 | |
| CN | 110802443 | | 2/2020 | |
| DE | 102010020951 | A1 * | 11/2011 | B23B 31/02 |

* cited by examiner

*Primary Examiner* — Alan Snyder
(74) *Attorney, Agent, or Firm* — Burris Law, PLLC

(57) ABSTRACT

A minimum quantity lubrication (MQL) tool including a lance. The lance includes a passageway and an orifice. The passageway extends axially from a first end of the lance toward a second end of the lance and allows a lubricant supply to flow therein from the first end of the lance toward the second end of the lance. The first orifice extends radially through the lance at a location near the second end of the lance. The lubricant supply flowing through the passageway exits the orifice and is impinged upon by air flowing around the lance.

20 Claims, 2 Drawing Sheets

LANCE AND MINIMUM QUANTITY LUBRICATION TOOL HAVING A LANCE

FIELD

The present disclosure relates to a lance and a minimum quantity lubrication (MQL) tool having a lance.

BACKGROUND

The statements in this section merely provide background information related to the present disclosure and may not constitute prior art.

Conventional machining uses high volume flow of a liquid lubricant over the cutting edges of the tool. Some tools having multiple cutting diameters have internal passages that provide this liquid lubricant to each cutting edge. Since the conventional liquid lubricant is essentially an incompressible fluid, flow from each passage to each cutting edge remains substantially based on the pressure of the liquid supplied to the tool.

In contrast, minimum quantity lubrication ("MQL") machining uses lubrication supplied to the cutting edges of a tool through a lean air-oil mist (i.e., an aerosol), rather than through the high-volume liquid-based emulsion in conventional machining. The ratio of air to oil in the air-oil mist is typically very high and the lubricant mist acts as a compressible fluid (unlike the incompressible liquid lubricant of conventional machining). An MQL tool holder is rotated about an axis by a spindle and typically holds the cutting tool for rotation about the axis while delivering the lubricant mist to the cutting tool. In high volume applications, the oil and air travel through the spindle separately and are released directly from the spindle into a chamber of the tool holder where they mix immediately upon receipt in the tool holder. The oil is fed to the tool holder through a lance inserted through the spindle. In a conventional lance, there is a single hole at the end of the lance, which results in fairly large oil droplets in the mist which agglomerate to form even larger drops inside the tool's coolant channels. This can lead to plugging in the tool, which reduces the efficiency of the tool and can increase the time needed before the desired ratio of air to lubricant exits the tool.

The present disclosure addresses these and other issues associated with MQL tool holders.

SUMMARY

This section provides a general summary of the disclosure and is not a comprehensive disclosure of its full scope or all of its features.

In one form, the present disclosure discloses a minimum quantity lubrication (MQL) tool including a lance. The lance includes a passageway and a first orifice. The passageway extends axially from a first end of the lance toward a second end of the lance and allows a lubricant supply to flow therein from the first end of the lance toward the second end of the lance. The first orifice extends radially through the lance at a location near the second end of the lance. Lubricant supply flowing through the passageway exits the first orifice and is impinged upon by air flowing around the lance.

In some configurations, the first orifice has a diameter that is less than 1 millimeter.

In some configurations, the first orifice is located between 1-2 millimeters away from the second end of the lance.

In some configurations, an end of the passageway extends through the second end of the lance. A cap plugs the end of the passageway to inhibit the lubricant supply flowing through the passageway from flowing out of the end of the passageway.

In some configurations, a second orifice extends radially through the lance at a location near the second end of the lance. The lubricant supply flowing through the passageway exits the second orifice and is impinged upon by air flowing around the lance.

In some configurations, the first orifice and the second orifice are diametrically opposed to each other.

In some configurations, the first orifice has a first diameter and the second orifice has a second diameter. The first diameter is greater than the second diameter.

In some configurations, the first orifice has a first diameter and the second orifice has a second diameter. The first diameter and the second diameter are equal to each other.

In some configurations, the first orifice extends radially from an inner cylindrical surface of the lance to an outer cylindrical surface of the lance.

In some configurations, the MQL tool further includes a spindle, a tool holder, a cutting tool, and a coupling. The spindle body is configured to rotate about an axis. The tool holder body is mounted to the spindle body for common rotation about the axis. The cutting tool is mounted to the tool holder body for common rotation about the axis. The cutting tool is configured to remove material from a workpiece. The coupling extends at least partially into the cutting tool and is configured to provide air-oil mist flowing therethrough to the cutting tool. The coupling receives an end portion of the lance.

In another form, the present disclosure discloses a minimum quantity lubrication (MQL) including a lance. The lance includes a passageway and a plurality of apertures. The passageway extends axially from a first end of the lance toward a second end of the lance and allows a lubricant supply to flow therein from the first end of the lance toward the second end of the lance. The plurality of apertures extend radially from an inner cylindrical surface of the lance to an outer cylindrical surface of the lance. The lubricant supply flowing through the passageway exits the plurality of apertures and is impinged upon by air flowing around the lance to form an air-oil mist at a location upstream of the second end of the lance.

In some configurations, the apertures have a diameter that is less than 1 millimeter.

In some configurations, the apertures are located between 1-2 millimeters away from the second end of the lance.

In some configurations, a first aperture of the plurality of apertures and a second aperture of the plurality of apertures are diametrically opposed to each other.

In some configurations, a third aperture of the plurality of apertures and a fourth aperture of the plurality of apertures are diametrically opposed to each other.

In some configurations, the first and second apertures have a first diameter and the third and fourth apertures have a second diameter. The first diameter is greater than the second diameter.

In some configurations, the first and second apertures have a first diameter and the third and fourth apertures have a second diameter. The first diameter and the second diameter are equal to each other.

In some configurations, the MQL tool further includes a tool holder, a cutting tool, and a coupling. The tool holder body is configured to rotate about an axis. The cutting tool is mounted to the tool holder body for common rotation about the axis. The cutting tool is configured to remove material from a workpiece. The coupling extends at least partially into the cutting tool and is configured to provide air-oil mist flowing therethrough to the cutting tool. The coupling receives an end portion of the lance.

In some configurations, the MQL tool further includes a spindle body configured to rotate about the axis. The tool holder body is mounted to the spindle body for common rotation about the axis.

In yet another form, the present disclosure discloses a minimum quantity lubrication (MQL) tool including a cutting tool, a coupling, and a lance. The cutting tool is configured to remove material from a workpiece. The coupling extends at least partially into the cutting tool and is configured to provide air-oil mist flowing therethrough to the cutting tool. The lance includes a first end and an opposing second end that extends at least partially into the coupling. The lance further includes a passageway and first and second orifices. The passageway extends axially from the first end of the lance toward the second end of the lance and allows a lubricant supply to flow therein. The first orifice extends radially from an inner cylindrical surface of the lance to an outer cylindrical surface of the lance. The second orifice extends radially from the inner cylindrical surface of the lance to the outer cylindrical surface of the lance. The second orifice diametrically opposed to the first orifice. The lubricant supply flowing through the passageway exits the first and second orifices and mixes with air flowing around the lance to form air-oil mist at a location upstream of the second end of the lance. The first and second orifices are located between 1-2 millimeters away from the second end of the lance and have a diameter that is less than 1 millimeter.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
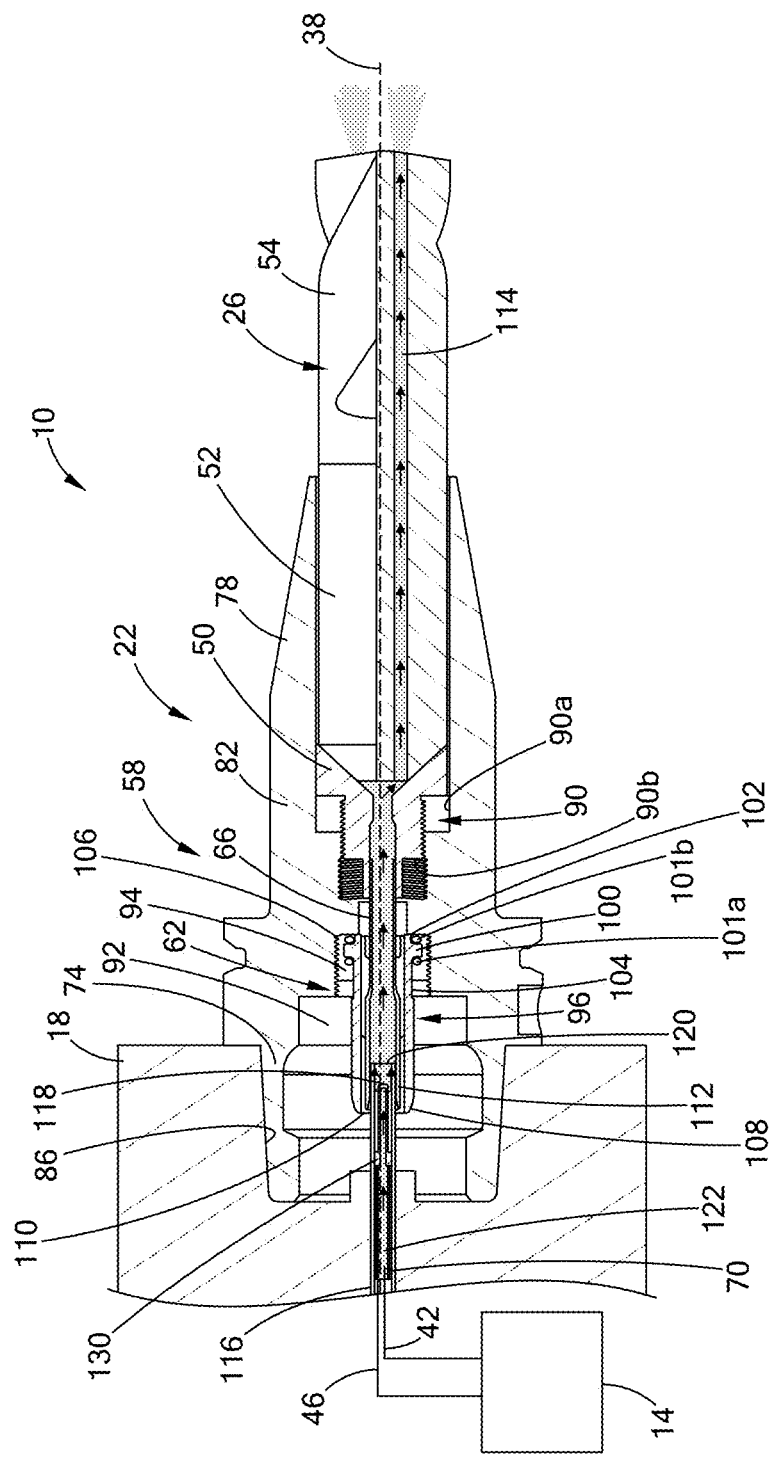
FIG. 1 is a partial cross-sectional view of a minimum quantity lubrication (MQL) tool according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a portion of a minimum quantity lubrication ("MQL") device or tool 10 is illustrated. The MQL tool 10 includes an MQL supply system 14, a spindle 18, a motor (not shown), and a tool holder assembly 22 configured to hold a cutting tool 26. In the example provided, the tool 10 also includes a rotary feedthrough (not shown) configured to connect the MQL supply system 14 to the spindle 18 to supply a gas (e.g., air) and a liquid lubricant (e.g., oil) to the tool holder assembly 22. The motor (not shown) is configured to rotate the spindle 18 about a central axis 38.

The MQL supply system 14 may be a 2-channel MQL system, for example, such that the MQL supply system 14 provides oil and compressed air in separate supply conduits 42, 46. Accordingly, the MQL supply system 14 can include an air compressor (not shown) or an inlet (not shown) configured to receive compressed air from a separate compressed air source (not shown), and a regulator (not shown) configured to control a pressure or flow rate of the compressed air. The MQL supply system 14 can also include an oil reservoir (not shown) or an inlet (not shown) configured to receive a supply of lubrication oil, and a device (e.g., a pump and/or regulator; not shown) configured to control a pressure or flow rate of the oil.

In the example provided, the air supply conduit 46 and the oil supply conduit 42 connect the MQL supply system 14 to the rotary feedthrough (not shown) for fluid communication therewith. The rotary feedthrough (not shown) is a rotary coupling providing fluid communication between the machine housing (not shown) and the spindle 18 (the coupling is composed of a stationary part, a rotary part, and a seal). The stationary part does not rotate but includes pathways (not shown) that maintain the oil and air separate from each other and provide oil to the tool holder assembly 22 and air to the tool holder assembly 22 so that the air and oil can travel separately from the rotary feedthrough (not shown) to the tool holder assembly 22 while the spindle 18 and the rotary part are rotating.

The tool holder assembly 22 is mounted to the spindle 18 for common rotation with the spindle 18 and is configured to support a base portion 52 of the cutting tool 26 for common rotation about the central axis 38 while a cutting portion 54 of the cutting tool 26 extends axially from the tool holder assembly 22 to engage a workpiece (not shown). The cutting tool 26 is mounted to the tool holder assembly 22 such that it can be removed and replaced with another or different cutting tool (not shown). The cutting tool 26 can be any suitable type of rotary tool, for example a milling bit, a drill, a tap, or a reamer, among others.

The tool holder assembly 22 generally includes a tool holder body 58, a seat 50, a transfer assembly 62, a coupler or coupling 66, and a lance 70. The tool holder body 58 is disposed about the central axis 38 and includes a driven portion 74, a tool receiving portion 78, and a mid-portion 82 that extends between the driven portion 74 and the tool receiving portion 78. The driven portion 74 is coupled to the spindle 18 to be rotated thereby. In the example provided, the driven portion 74 is received in a recess 86 of the spindle 18 and engaged by the spindle 18 for common rotation about the central axis 38. The mid-portion 82 extends axially from the driven portion 74 and away from the spindle 18. The tool receiving portion 78 includes a stepped bore 90 configured to receive the seat 50 for common rotation about the central axis 38. That is, the stepped bore 90 includes a first inner circumferential surface 90a and a second inner circumferential surface 90b. The first inner circumferential surface 90a has a diameter that is greater than a diameter of the second inner circumferential surface 90b and is unthreaded. The second inner circumferential surface 90b is threaded. The seat 50 is received in the stepped bore 90 and threads on one end of the seat 50 are threadably engaged with threads of the second inner circumferential surface 90b thereby securing the seat 50 to the tool holder body 58. The cutting tool 26 is received in the stepped bore 90 and seals with the opposite end of the seat 50 (e.g., with mating conical faces). The cutting tool 26 is held in the stepped bore 90 for common rotation about the central axis 38 with the tool receiving portion 78 such as by a nut or ring (not shown) disposed about the tool receiving portion 78 that can compress the tool receiving portion 78 radially inward on the cutting tool 26.

The transfer assembly 62 is disposed within an aperture 92 of the tool holder body 58 and includes an externally threaded portion 94 and a transfer body 96. The externally threaded portion 94 is threadably engaged with internal threads of the tool holder body 58 such as within the driven portion 74 or within the mid-portion 82 proximate to the driven portion 74. The transfer body 96 includes a shoulder 100 at or near a distal end 102 thereof that extends radially outwardly from an outer cylindrical surface 104 of the transfer body 96. A pair of sealing members 101a, 101b (e.g., O-rings) are disposed about the distal end 102 on opposite sides of the shoulder 100 such that the threaded portion 94 compresses the sealing member 101a against the shoulder 100 and the shoulder 100 compresses the sealing member 101b against an annular land 106 of the tool holder body 58 when the threaded portion 94 is tightened.

A proximal end 108 of the transfer body 96 defines an inlet 110 coaxial with the central axis 38. An inner body 112 is disposed within and coupled to the transfer body 96. The inner body 112 is also coaxial with the transfer body 96. In some configurations, the inner body 112 may be press-fit within the transfer body 96.

The coupler 66 engages the lance 70. The coupler 66 is disposed within the transfer body 96 (and the tool holder body 58) and extends through the inner body 112 and at least partially through the seat 50. The coupler 66 is configured to provide air-oil mist flowing therethrough via the lance 70 to the cutting tool 26 (via the seat 50) where the air-oil mists flows to the workpiece via one or more fluid channels 114 formed in the cutting tool 26. Stated differently, the coupler 66 fluidly couples the lance 70 and the cutting tool 26 via the seat 50.

The lance 70 is a cylindrical tube disposed coaxially about the central axis 38 and extends through an air conduit 116. The lance 70 has a proximal end (not shown) that extends from and is in fluid communication with the oil pathway of the rotary feedthrough (not shown) and a distal end 118 that extends at least partially through the coupler 66 (and the transfer body 96). The air conduit 116 is disposed coaxially about the central axis 38 and includes a distal end 120 that extends at least partially through the coupler 66. The air conduit 116 is also in fluid communication with the compressed air source via the air pathway of the rotary feedthrough such that compressed air from the compressed air source flows through the air conduit 116 into the coupler 66.

Figure 2:
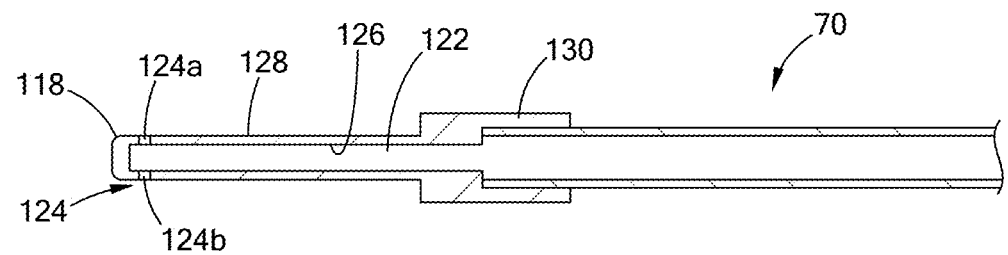
FIG. 2 is a cross-sectional view of a portion of a lance of the MQL tool of FIG. 1.

With reference to FIGS. 1 and 2, the lance 70 includes a passageway 122 and a plurality of orifices or apertures 124 (shown best in FIG. 2). The passageway 122 extends axially from the proximal end (not shown) of the lance 70 towards the distal end 118 of the lance 70 and is configured to allow liquid lubricant supply to flow therein from the proximal end toward the distal end 118. The distal end 118 is closed such that lubricant fluid does not exit axially from the lance 70. Each orifice 124 extends radially through the lance 70 at a location near the distal end 118 (in the example provided, the orifices 124 are located between 1-2 millimeters away from the distal end 118 of the lance 70). Stated differently, the orifices 124 extend from an inner cylindrical surface 126 of the lance 70 to an outer cylindrical surface 128 of the lance 70. The orifices 124 have a diameter that is equal to or less than 1 millimeter (mm). A first orifice 124a of the plurality of orifices 124 and a second orifice 124b of the plurality of orifices 124 are diametrically opposed to each other. As shown in the figures, the orifices 124a, 124b have a diameter that is equal to each other. In some configurations, however, the diameter of the orifice 124a may be greater than or less than the diameter of the orifice 124b. In other configurations, the orifices 124a, 124b may be circumferentially offset from each other by less than 180 degrees (i.e., not diametrically opposite each other). The lubricant supply flowing through the passageway 122 exits the orifices 124 and is impinged by compressed air flowing through the air conduit 116 and around the lance 70 to form an air-oil mist at a location upstream of the distal end 118 of the lance 70. The air-oil mist flows through the coupler 66 and the one or more channels 114 of the cutting tool 26 and to the workpiece.

One or more bulge portions 130 are disposed around the lance 70 and along a length of the lance 70. The bulge portions 130 assist in centering the lance 70 within the air conduit 116 as the lance 70 is rotating about the central axis 38. In this way, the lance 70 is rotatably supported within the air conduit 116.

Figure 3:
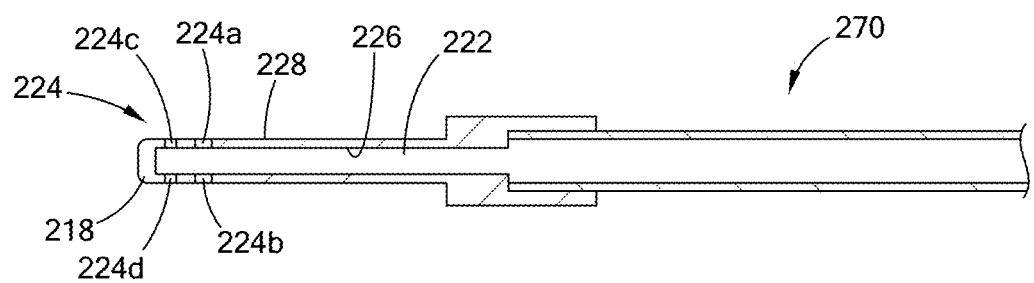
FIG. 3 is a cross-sectional view of a portion of another lance in accordance with the principles of the present disclosure.

With reference to FIG. 3, another lance 270 is provided. The lance 270 may be incorporated into the MQL tool 10 above instead of lance 70. The structure and function of lance 270 may be similar or identical to lance 70 described above, apart from any exceptions noted below.

The lance 270 includes a passageway 222 and a plurality of orifices or apertures 224. The passageway 222 extends axially from a proximal end of the lance 270 towards a distal end 218 of the lance 270 and is configured to allow lubricant supply to flow therein from the proximal end toward the distal end 218. The distal end 218 is closed such that lubricant fluid does not exit axially from the lance 270. Each orifice 224 extends radially through the lance 270 at a location near the distal end 218 (in the example provided, the orifices 224 are located between 1-3 millimeters away from the distal end 218 of the lance 270). Stated differently, the orifices 224 extend from an inner cylindrical surface 226 of the lance 270 to an outer cylindrical surface 228 of the lance 270. The orifices 224 have a diameter that is equal to or less than 1 millimeter (mm). A first orifice 224a of the plurality of orifices 224 and a second orifice 224b of the plurality of orifices 224 are diametrically opposed to each other. Similarly, a third orifice 224c of the plurality of orifices 224 and a fourth orifice 224d of the plurality of orifices 224 are diametrically opposed to each other and are axially between the orifices 224a, 224b and the distal end 218. As shown in the figure, the orifices 224a, 224b have a first diameter that is equal to each other and the orifices 224c, 224d have a second diameter that is equal to each other. The first diameter is greater than the second diameter. In some configurations, however, the first diameter may be equal to or less than the second diameter. In other configurations, each of the orifices 224a, 224b, 224c, 224d may have a different diameter. The lubricant supply flowing through the passageway 222 exits the orifices 224 and is impinged by compressed air flowing through the air conduit 116 and around the lance 270 to form an air-oil mist at a location upstream of the distal end 218 of the lance 270.

Figure 4:
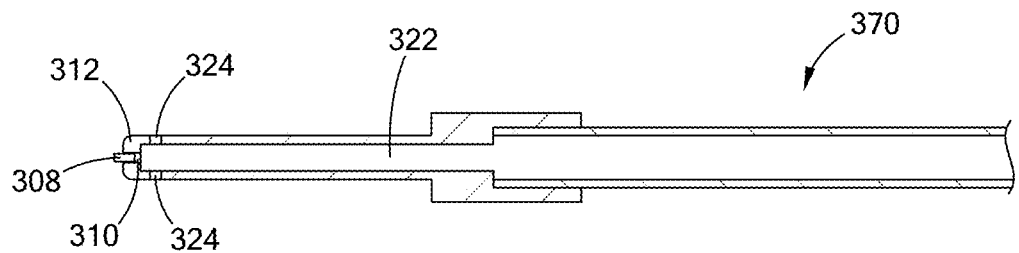
FIG. 4 is a cross-sectional view of a portion of yet another lance in accordance with the principles of the present disclosure.

With reference to FIG. 4, another lance 370 is provided. The lance 370 may be incorporated into the MQL tool 10 above instead of lances 70, 270. The structure and function of lance 370 may be similar or identical to lances 70, 270 described above, apart from any exceptions noted below.

The lance 370 includes a passageway 322 and a plurality of orifices or apertures 324. The passageway 322 extends axially from a proximal end of the lance 370 towards a distal end 318 of the lance 370 and is configured to allow lubricant supply to flow therein from the proximal end toward the distal end 318. A cap 308 plugs an opening 310 extending through an end wall 312 of the lance 370. In this way, the lubricant supply flowing through the passageway 322 is inhibited from flowing through the opening 310. The structure and function of the orifices 324 may be similar or identical to the orifices 124 or 224 described above, and therefore, will not be described again in detail. The lance 370 provides the benefit of allowing conventional lances to be retrofitted with orifices extending radially through the lance while plugging the hole extending axially through the end of the lance. In this way, lubricant flowing through the lance exits the orifices and is inhibited from exiting axially from the hole 310.

Thus, the present disclosure also includes a method of modifying a conventional lance. The method can include, among other steps, providing a lance with an aperture open through a distal end of the lance. The method can proceed by plugging the aperture in the distal end and forming a plurality of apertures radially through an inner cylindrical surface of the lance to an outer cylindrical surface of the lance. The plurality of apertures formed can be formed as described above with reference to the lance 70, 270, or 370.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A minimum quantity lubrication (MQL) tool comprising:
   a lance rotatable about a longitudinal axis, the lance including:
      a passageway extending axially from a first end of the lance toward a second end of the lance and allowing a lubricant supply to flow therein from the first end of the lance toward the second end of the lance; and
      a first orifice extending radially through the lance at a location near the second end of the lance,
   wherein the lubricant supply flowing through the passageway exits the first orifice and is impinged upon by air flowing around the lance to form an air-oil mist at a location upstream of the second end of the lance.

2. The MQL tool according to claim 1, wherein the first orifice has a diameter that is less than 1 millimeter.

3. The MQL tool according to claim 1, wherein the first orifice is located between 1-2 millimeters away from the second end of the lance.

4. The MQL tool according to claim 1, wherein an end of the passageway extends through the second end of the lance, and wherein a cap plugs the end of the passageway to inhibit the lubricant supply flowing through the passageway from flowing out of the end of the passageway.

5. The MQL tool according to claim 1, wherein a second orifice extends radially through the lance at a location near the second end of the lance, and wherein the lubricant supply flowing through the passageway exits the second orifice and is impinged upon by air flowing around the lance.

6. The MQL tool according to claim 5, wherein the first orifice and the second orifice are diametrically opposed to each other.

7. The MQL tool according to claim 5, wherein the first orifice has a first diameter and the second orifice has a second diameter, and wherein the first diameter is greater than the second diameter.

8. The MQL tool according to claim 6, wherein the first orifice has a first diameter and the second orifice has a second diameter, and wherein the first diameter and the second diameter are equal to each other.

9. The MQL tool according to claim 1, wherein the first orifice extends radially from an inner cylindrical surface of the lance to an outer cylindrical surface of the lance.

10. The MQL tool according to claim 1, further comprising:
    a spindle body configured to rotate about an axis;
    a tool holder body mounted to the spindle body for common rotation about the axis;
    a cutting tool mounted to the tool holder body for common rotation about the axis, the cutting tool configured to remove material from a workpiece; and
    a coupling extending at least partially into the cutting tool and configured to provide air-oil mist flowing therethrough to the cutting tool, the coupling receiving an end portion of the lance.

11. A minimum quantity lubrication (MQL) tool comprising:
    a lance rotatable about a longitudinal axis, the lance including:
       a passageway extending axially from a first end of the lance toward a second end of the lance and allowing a lubricant supply to flow therein from the first end of the lance toward the second end of the lance; and a plurality of apertures extending radially from an inner cylindrical surface of the lance to an outer cylindrical surface of the lance, wherein the lubricant supply flowing through the passageway exits the plurality of apertures and is impinged upon by air flowing around the lance to form an air-oil mist at a location upstream of the second end of the lance.

12. The MQL tool according to claim 11, wherein the apertures have a diameter that is less than 1 millimeter.

13. The MQL tool according to claim 11, wherein the apertures are located between 1-2 millimeters away from the second end of the lance.

14. The MQL tool according to claim 11, wherein a first aperture of the plurality of apertures and a second aperture of the plurality of apertures are diametrically opposed to each other.

15. The MQL tool according to claim 14, wherein a third aperture of the plurality of apertures and a fourth aperture of the plurality of apertures are diametrically opposed to each other.

16. The MQL tool according to claim 15, wherein the first and second apertures have a first diameter and the third and fourth apertures have a second diameter, and wherein the first diameter is greater than the second diameter.

17. The MQL tool according to claim 15, wherein the first and second apertures have a first diameter and the third and fourth apertures have a second diameter, and wherein the first diameter and the second diameter are equal to each other.

18. The MQL tool according to claim 11, further comprising:
 a tool holder body configured to rotate about an axis;
 a cutting tool mounted to the tool holder body for common rotation about the axis, the cutting tool configured to remove material from a workpiece; and
 a coupling extending at least partially into the cutting tool and configured to provide air-oil mist flowing therethrough to the cutting tool, the coupling receiving an end portion of the lance.

19. The MQL tool according to claim 18, further comprising a spindle body configured to rotate about the axis, the tool holder body mounted to the spindle body for common rotation about the axis.

20. A minimum quantity lubrication (MQL) tool comprising:
 a cutting tool configured to remove material from a workpiece;
 a coupling extending at least partially into the cutting tool and configured to provide air-oil mist flowing therethrough to the cutting tool; and
 a lance rotatable about a longitudinal axis, the lance including a first end and an opposing second end that extends at least partially into the coupling, the lance further includes:
  a passageway extending axially from the first end of the lance toward the second end of the lance and allowing a lubricant supply to flow therein;
  a first orifice extending radially from an inner cylindrical surface of the lance to an outer cylindrical surface of the lance; and
  a second orifice extending radially from the inner cylindrical surface of the lance to the outer cylindrical surface of the lance, the second orifice diametrically opposed to the first orifice,
 wherein the lubricant supply flowing through the passageway exits the first and second orifices and is impinged upon by air flowing around the lance to form air-oil mist at a location upstream of the second end of the lance,
 wherein the first and second orifices are located between 1-2 millimeters away from the second end of the lance and have a diameter that is less than 1 millimeter.

* * * * *